United States Patent [19]

Mohri

[11] E Patent Number: Re. 33,706

[45] Reissued Date of Patent: Oct. 1, 1991

[54] TABLE DRIVEN TRANSLATOR

[75] Inventor: Shunji Mohri, Yokohama, Japan

[73] Assignee: Hitachi, Ltd., Tokyo, Japan

[21] Appl. No.: 304,118

[22] Filed: Jan. 31, 1989

Related U.S. Patent Documents

Reissue of:

[64] Patent No.: 4,712,189
Issued: Dec. 8, 1987
Appl. No.: 663,944
Filed: Oct. 23, 1984

[30] Foreign Application Priority Data

Oct. 24, 1983 [JP] Japan ..... 58-197671

[51] Int. Cl.[5] ..... G06F 9/00

[52] U.S. Cl. ..... 394/900; 364/947.2; 364/963.3; 364/977

[58] Field of Search ..... 364/200, 900

[56] References Cited

U.S. PATENT DOCUMENTS 4,202,041 5/1980 Kaplow et al. ..... 364/900
4,374,408 2/1983 Bowles et al. ..... 364/200

FOREIGN PATENT DOCUMENTS 2309929 3/1976 France .
1344999 2/1971 United Kingdom .
1498371 3/1976 United Kingdom .

OTHER PUBLICATIONS

IBM Technical Disclosure Bulletin, vol. 15, No. 5, Oct. 1972, pp. 1639-1642, New York, U.S. H. Diel et al., "Language Conversion Based on Abstract Syntax".

*Primary Examiner*—Gareth D. Shaw
*Assistant Examiner*—John G. Mills
*Attorney, Agent, or Firm*—Antonelli, Terry, Stout & Kraus

[57] ABSTRACT

A table driven translator is provided which is capable of translating an input language into a machine-oriented language and handing changes in the syntax of the language inputted to a computer by rewriting a translation rule table. The translator comprises an input device for inputting an input language to the computer, an internal storage for storing a name table for registering keywords associated with the syntax of the input language and characteristics of variable contained in the input language, and for storing an interpretation table for indicating procedures to control a flow of processing for interpreting the input language, and a control device for searching the name table to obtain an address of a location in the internal store device at which desired reserved words or a keyword is stored and to obtain from the name table an attribute of the keyword and variable and for checking whether or not the reserved word coincides with the input language syntax by a comparator comparing the attribute with an attribute stored in a field at a location indicated by a table pointer in the interpretation table, that is, the reserved word is assumed to be conforming to the input language syntax if these attributes are equal to each other, thereby to execute an interpretation processing and to translate the input language into a machine-oriented language suitable for a desired computer. The maintainability and expandability of language processing in the computer is improved.

9 Claims, 12 Drawing Sheets

FIG. 4

41

| 411 NAME | 412 ATTRIB-UTE | 413 ADDRESS | 414 IL CODE | 415 VALUE | 416 POINTER TO THE INTERPRETATION TABLE |
|---|---|---|---|---|---|
| MOVE | MCDMOV | — | 101 | — | MOV000 |
| A | MCDHKN | — | — | 1 | — |
| I | MCDHKN | — | — | 2 | — |
| C | MCDHKN | — | — | 3 | — |
| S | MCDS | — | — | 1 | — |
| H | MCDH | — | — | 2 | — |
| ⋮ | ⋮ | ⋮ | ⋮ | ⋮ | ⋮ |
| P001 | MCDPNT | 400 | — | — | — |
| ⋮ | ⋮ | ⋮ | ⋮ | ⋮ | ⋮ |

FIG. 5

| 421 LABEL | 422 ATTRIBUTE | 423 OK | 424 OKIL | 425 OKNEXT | 426 NONEXT |
|---|---|---|---|---|---|
| MOV 000 | MCDHKN | SETIL | CODE | MOV 001 | ERRHKN * |
| MOV 001 | , | NOP | | MOV 002 | ERRDLM * |
| MOV 002 | MCDPNT | SETIL | ADR | MOV 003 | ERRITM * |
| MOV 003 | , | NOP | | MOV 004 | MOV 009 |
| MOV 004 | MCDS | SETIL | CODE | MOV 006 | MOV 005 |
| MOV 005 | MCDH | SETIL | CODE | MOV 006 | ERR O°T * |
| MOV 006 | = | NOP | | MOV 007 | ERRDLM * |
| MOV 007 | MCDINO | SETIL | ADR | MOV 009 | MOV 008 |
| MOV 008 | MCDIVR | SETIL | ADR | MOV 009 | ERRITM * |
| MOV 009 | MCDEND | | | | ERREND * |

42

| NAME | DISPLACE-MENT | FLAG |
|---|---|---|
| 427 | 428 | 429 |

FIG. 6

| NAME | MEANING |
|---|---|
| MCDHKN | SYMBOL NAME OF THE ATTRIBUTE ASSIGNED TO THE INTERPOLATING METHOD |
| SETIL | PROCESSING ROUTINE NAME TO BE USED WHEN THE ATTRIBUTES ARE EQUAL TO EACH OTHER |
| CODE | PROCESSING NAME FOR SETTING A DETAILED CODE OF THE INTERPOLATING METHOD |
| ERRHKN | SYMBOL NAME OF AN ERROR NUMBER INDICATING AN INTERPOLATING METHOD ERROR |
| MCDPNT | ATTRIBUTE ASSIGNED TO A VARIABLE INDICATING A POSITION |
| ADR | PROCESSING NAME FOR SETTING AN ADDRESS IN THE MEMORY AT WHICH THE POINT IS TO BE STORED |
| ERRITM | ERROR NUMBER NAME INDICATING THAT AN INVALID ITEM HAS BEEN FOUND |
| NOP | PROCESSING SYMBOL NAME INDICATING THAT NO OPERATION IS TO BE EXECUTED |
| ERRDLM | NAME OF AN ERROR NUMBER INDICATING AN ERROR IN SPECIFYING A DELIMITER CODE |
| ERROPT | ERROR NUMBER NAME INDICATING THAT AN INVALID OPTION HAS BEEN FOUND |
| MCDINO | ATTRIBUTE ASSIGNED TO AN INTEGER CONSTANT |
| MCDIVR | ATTRIBUTE ASSIGNED TO AN INTEGER VARIABLE |
| MCDEND | END CODE NAME OF A STATEMENT |
| ERREND | NAME OF AN ERROR NUMBER INDICATING AN ABNORMAL END OF A STATEMENT |

FIG. 11a

| 431 | 432 | 433 | 434 | 435 | 436 | 43 |
|---|---|---|---|---|---|---|
| INSTRUC-TION CODE | NUMBER OF OPERANDS | OPERAND #1 | OPERAND #2 | OPERAND #3 | OPERAND #4 | --- |

FIG. 11b

| 431 | 432 | 433 | 434 | 435 | 436 | 43 |
|---|---|---|---|---|---|---|
| 100 | 4 | 1 | 400 | 1 | 10 | --- |

FIG. 12

| 421 | 422 | 423 | 424 | 425 | 426 |
|---|---|---|---|---|---|
| LABEL | ATTRIBUTE | OK | OKIL | OKNEXT | NONEXT |
| INT 000 | MCDINO | SETIL | INTFN+2* | INTFN+3* | INTFN |
| INTFN | MCDIVR | SETIL | | | |
| ⋮ | | | | | |
| MOV 007 | INT 000* | INTFN+2 | ADR | MOV 009 | ERRITM* |
| MOV 009 | MCDEND | | | | ERREND* |

42

FIG. 14

| 421 LABEL | 422 ATTRIBUTE | 423 OK | 424 OKIL | 425 OKNEXT | 426 NONEXT |
|---|---|---|---|---|---|
| L0001 | --- | S001 * | S003+4 | L0002 | --- |
| L0002 | --- | | | | |
| ⋮ | | | | | |
| S001 * | — | P1 | ADR | S002 | — |
| S002 * | — | P2 * | P2E+4 | S003 | — |
| S003 * | — | P3 | ADR | L0002 | — |
| P2 * | — | P21 | --- | P2E | — |
| P2E * | — | P22 | --- | S003 | — |

42

FIG. 16

| 421 LABEL | 422 ATTRIBUTE | 423 OK | 424 OKIL | 425 OKNEXT | 426 NONEXT |
|---|---|---|---|---|---|
| DO001 | MCDINO | SETIL | LABEL | DO002 | TO AN ASSIGNMENT STATEMENT PROCESSING |
| DO002 | MCDIVR | SETIL | ADR | DO003 | TO AN ASSIGNMENT STATEMENT PROCESSING |
| DO003 | = | NOP | | DO004 | |
| DO004 | INT000 * | SETIL | ADR | DO005 | TO AN ASSIGNMENT STATEMENT PROCESSING |
| DO005 | , | NOP | | DO006 | TO AN ASSIGNMENT STATEMENT PROCESSING |
| DO006 | | | | | |
| ⋮ | | | | | |

42

TABLE DRIVEN TRANSLATOR

Matter enclosed in heavy brackets [ ] appears in the original patent but forms no part of this reissue specification; matter printed in italics indicates the additions made by reissue.

The present invention relates to a necessary translator for processing a language in a computer system, and in particular, to a table driven translator which is capable of dealing with a change in the syntax of the language inputted to the computer system.

A variety of translators and compilers have been proposed. For example, such translation techniques can be found in "Compiler Techniques", Pollack, Auerback Publisher, 1972 and "A Compiler Generator", Mackeeman et al., Prentice-Hall Inc., 1970. According to these prior art language processing methods, an appropriate language processing program is generated for each type of the input statement. Consequently, the processing program must be rewritten if the syntax of the input language is changed, that is, the same translator or compiler cannot process various kinds of languages without program modification.

It is therefore an object of the present invention to provide a general-purpose table driven translator which can perform the language processing by modifying translation interpretation tables when the syntax of the input language is changed, eliminating a rewrite burden.

Another object of the present invention is to provide a table driven translator which improves the maintainability and expandability of the language processing in a computer system.

Another object of the present invention is to provide a table driven translator which allows compression of the contents of a table containing the information about the syntactical check and processing to be executed after the syntactical check of the input language.

In accordance with the present invention, there is provided a table driven translator comprising: an input device for inputting an input language to a computer, an internal storage for storing a name table for storing keywords associated with the syntax of the input language and characteristics of variables contained in the input language and for storing an interpretation table for indicating procedures to control a flow of processing for interpreting the input language, and a controller for searching the name table to obtain an address of a location in said internal storage at which a desired reserved word (keyword) is stored and to obtain from said name table an attribute of the keyword and variable and for checking whether or not the reserved word compiles with the input language syntax by comparing the attribute with an attribute stored in a field at a location (indicated by a table pointer) in the interpretation table (that is, the reserved word is assumed to be conforming to the input language syntax if these attributes are equal to each other), thereby to execute an interpretation processing and to translate the input language into a machine-oriented language suitable for a desired computer.

In summary, the present invention utilizes a table or tables containing information regarding the syntactical check of an input language and processing to be executed after the syntactical check and permits processing with any syntactical change of the input language by only modifying the contents of the table or tables.

In general, a translator has the main functions as follows.

(1) Determination of the characteristic (attribute) of each word in the input language (2) Checking for determining whether or not the attribute conforms to the input language syntax (3) Processing after the check (I) Processing when the attribute conforms to the syntax rules (II) Processing when the attribute does not conform to the syntax rules The functions associates with (2) and (3) above for the language translation are stored in tables to manage such information independently of the translator program.

The object and features of the present invention will become more apparent from the consideration of the following detailed description taken in conjunction with the accompanying drawings in which:

FIG. 4 is a diagram showing an example of the name table format of FIG. 1;

FIG. 5 is a diagram showing a table format example of an interpretation table of FIG. 1;

FIG. 6 is a table for explaining the codes listed in FIG. 5;

FIGS. 11a and 11b are diagrams each illustrating the format of a machine-oriented language information;

FIG. 12 is an example of a subroutine description in the interpretation table of FIG. 5;

FIG. 14 is a table for explaining an example of information to be set to TR registers in the interpretation table of FIG. 5;

FIG. 16 is a table for explaining another example of information to be set to TR registers in the interpretation table of FIG. 5.

Figure 1:
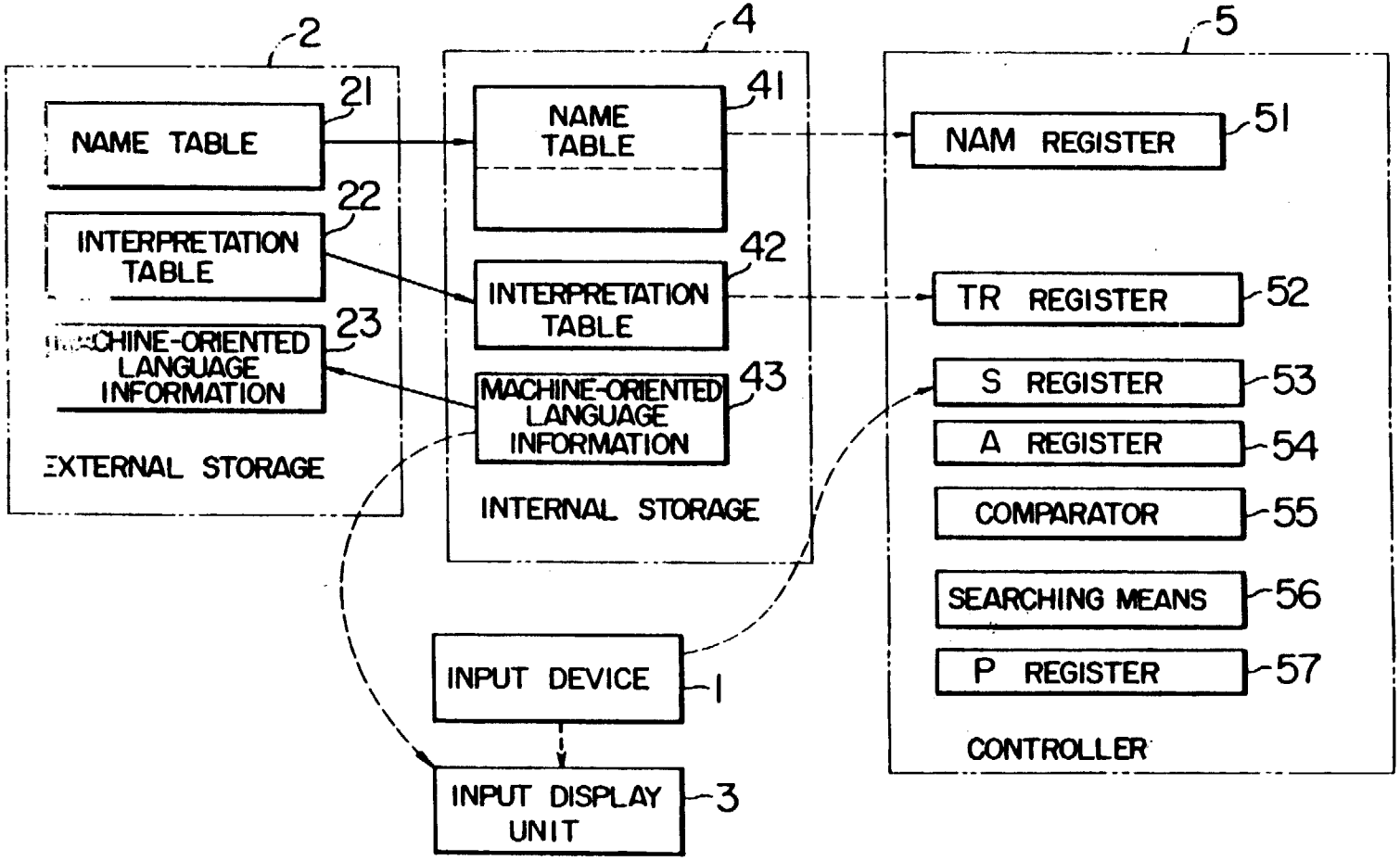
FIG. 1 is a schematic block diagram of an embodiment of a table driven translator in accordance with the present invention.

Referring to FIG. 1, an embodiment of a table driven translator in accordance with the present invention comprises an input device 1 including, for example, an input apparatus such as a keyboard, an external storage 2 including, for instance, a bubble memory or a floppy disk memory, an input display unit 3 such as a CRT display unit or a printer, an internal storage 4, and a control means 5 for performing an information processing by the use of the storage described above and which may be configured with, for example, a microcomputer.

In addition to the alphanumeric keys, the input device 1 has so-called special keys for inputting delimiter codes such as a comma "," and a semicolon ";" and operation codes such as an asterisk "*", a slant "/", a plus "+" sign, a minus sign "−" and an equal sign "=", required for specific input language syntax.

The external storage 2 comprises a name table 21 in which keywords and reserved words associated with the input language grammar are stored in advance, an interpretation table 22 for storing information about syntax check as translation control procedures for the input language grammar and about procedures for generating a machine-oriented language, and machine-oriented language information 23 to be outputted as a processing result.

The input display unit 3 is a display device such as a line printer, a serial printer, or a CRT unit for outputting system information, error messages, echo-back information (source statements) of input language, and a summary of processing results such as a list of variables used and the program size.

The internal storage 4 comprises a random access memory (RAM) into which tables stored in the external storage device 2 are read for the pertinent processing.

The control device 5 comprises a NAM register 51 for storing a row (field) of the name table, a TR register 52 for storing a field of the interpretation table, an S (syllable) register 53 for storing the character image of a word or a delimiter code obtained from the input language data, an A (attribute) register for indicating an attribute corresponding to the content of the S register 53 (if the S register 53 is assumed to correspond to a word, a delimiter, or the like, the attribute is indicated by a code value representing the meaning of the content of the S register 53), a comparator 55 for comparing register contents, a searching means 56 for searching items of the tables in the internal storage 4, and a P register 57 to be used as an index for searching an item in a table.

Figure 3:
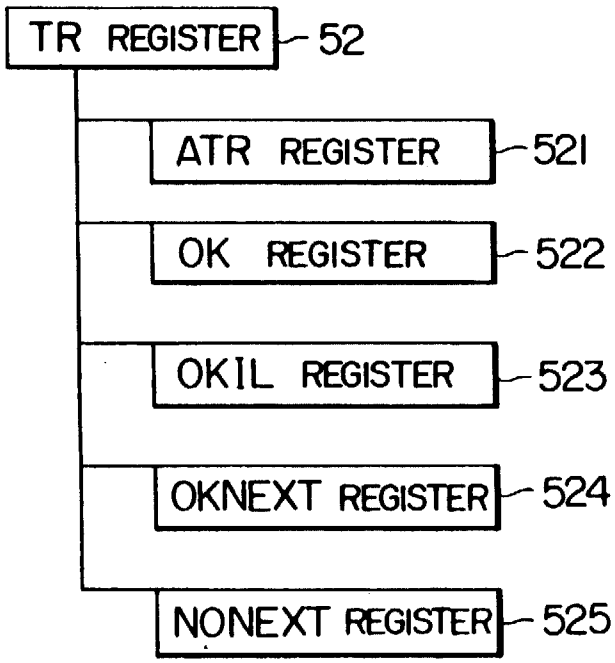
FIG. 3 is a diagram showing an example of the TR register configuration in the control device of FIG. 1.
Figure 2:
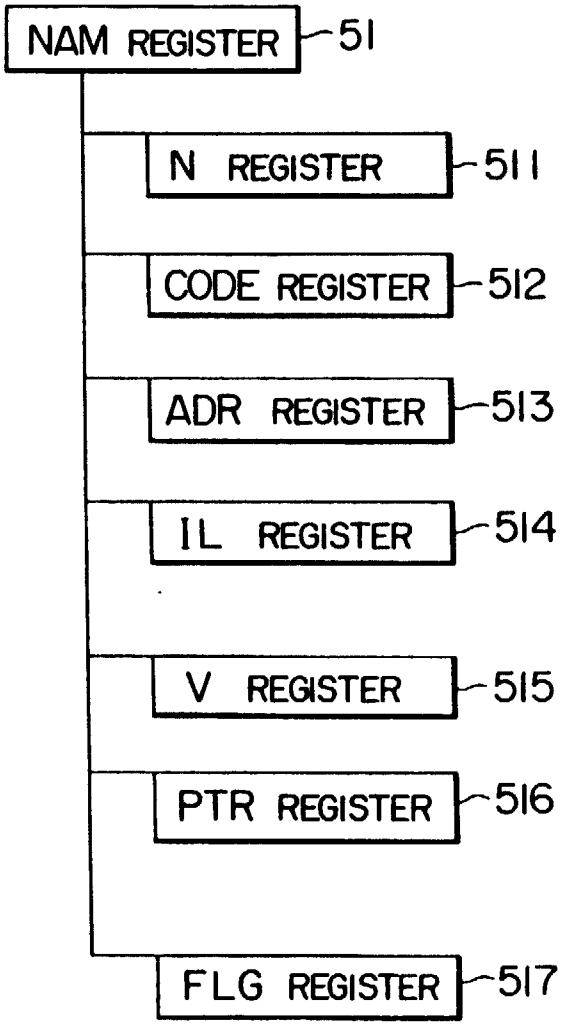
FIG. 2 is a diagram illustrating an example of the NAM (name) register configuration in a control device of FIG. 1.

FIG. 2 and FIG. 3 depict a configuration of the NAM register 51 in the control device 5 and a configuration of the TR register 52, respectively. Information to be stored in these registers will be described in detail later in this specification.

This embodiment is effective for the interpretation of the computer language in general. Since such words to be used for the language processing an an "IF" statement for determining a condition and a "GOTO" statement for branching the processing route are specified as reserved words, the embodiment is especially efficient when applied to a language system in which these words cannot be used for other purposes. Such an example will be described in conjunction with the accompanying drawings.

Assuming that instructions for operations of a robot are specified with the input statements listed in the following program example, the desired robot operations can be implemented by generating a name table and an interpretation table depicted in FIG. 4 and FIG. 5, respectively.

| PROGRAM EXAMPLE |
|---|
| DX = 10.0 |
| DY = 10.0 |
| DZ = 0 |
| L1: |
| IF DZ = 1.0 THEN GOTO L2 |
| MOVE A, POO1, S |
| . |
| . |
| . |
| L2: |
| STOP |

-continued

| PROGRAM EXAMPLE |
|---|
| END |

In this program example, the input statement "MOVE A, POO1, S=100" means that the robot is moved from the current position (value) to POO1 at a speed of 100 mm/s and that the interpolation method for generating the robot trajectory is specified as method A.

A name table 41 of FIG. 4 is provided for storing the system reserved words such as MOVE A, I, C, S, and H in advance. The intrinsic variables defined in a program by the user, for example, POO1 and EXAMPLE and DX specified in this program example are also stored in the name table 41 as a result of the translation in addition to the reserved words. In FIG. 4, for instance, POO1 is a name of a teaching point defined by user and it is assumed that symbol POO1 has been defined and that the address for storing the relevant data is address 400.

An interpretation table 42 of FIG. 5 is utilized to store information about the syntax check of the input language and about the processing (control procedures to be performed by the translator) after the syntax check. FIG. 5 is a specific example of a translation control procedure for a robot language associated with the following grammar rule.

$$\text{MOVE}\left\{\begin{matrix} A \\ I \\ C \end{matrix}\right\}, \text{point name}\left[,\left\{\begin{matrix} S \\ H \end{matrix}\right\}= \text{integer}\right]$$

where; MOVE is an instruction word, A, I, and C are codes indicating an interpolating method, and the parameters enclosed with square brackets may be omitted, and S and H are the pertinent option codes.

This syntactical expression indicates that the robot should move from the current point to a point indicated by the point name parameter by the use of the interpolation method A, I, or C. If necessary, the speed and hand action can be specified in this case as follows. For a speed specification, the user can specify S=100 for a speed of 100 mm/s. Hand actions can be specified as H=0 for closing the hand by the time when the robot arrives at the destination and as H=1 for opening the hand by the time when the robot arrives at the destination. For these interpolation methods, 'A' indicates so-called point-to-point (PTP) control mode in which the interpolation is not carried out between points, 'I' indicates a mode in which a linear interpolation takes place between points, and 'C' indicates a mode in which the interpolation is carried out continuously through several points.

FIG. 6 lists the meanings of symbol names shown in FIG. 5. The same value cannot be assigned to items having the different names. The number of rows (fields) of these tables changes depending on the purpose of processing.

Next, each field of name table 41 depicted in FIG. 4 and interpretation table 42 illustrated in FIG. 5 will be described.

The fields of name table 41 are utilized as follow:

Name field 411: Stores a reserved word name (MOVE, etc.) or a variable name (POO1, etc.) to be registered.

Attribute field 412: Stores a unique code specified for the meaning of a registered name.

Address field 413: Stores the address of a registered variable in the memory (for instance, address 400 for POO1).

IL: code field 414: Stores a code (for example, 101) indicating the type of a reserved word.

Value field 415: Stores the detailed classification (for instance, A, I, and C) for each of reserved words having the same attributes.

Field of pointer to the interpretation table 416: Indicates a location in the interpretation table 42 at which the interpretation control procedure for the instruction indicated by the reserved word is started.

The NAM register 51 for storing therein a field of the name table 41 comprises an N register 511, a CODE register 512, an ADR register 513, an IL register 514, a V register 515, a PTR register 516, and a FLG register for indicating a status (as to whether a given name is already stored or not) determined by a search operation as illustrated in FIG. 2.

The N register 511 is used to store one of the reserved words (for example, MOVE) stored in the name fields 411 of FIG. 4. The code register 12 keeps a code value in an attribute field 42. The ADR register 513 stores an address held in an address field 413; the IL register 514 keeps a code stored in an IL code field 414; the V register 515 stores the detailed classification of a reserved word retained in a value field 415; and the PTR register 516 keeps a pointer value stored in a pointer field 416.

The interpretation table 42 has a complex structure, so the information is not directly represented with numeric values, but the table 42 is subdivided into two tables as follows:

(1) Human-oriented table mainly containing information represented with characters (2) Table containing machine-oriented numeric values obtained by converting the relevant information That is, the table marker (a system programmer) first specifies necessary parameters with characters (i.e. human-oriented table), then the specified parameters are converted into numeric values by a table generator system (i.e. machine-oriented table) to be stored in the table (2). FIG. 5 depicts the human-oriented interpretation table 42, which will be simply referred to as interpretation table hereafter unless otherwise specified.

The difference between the human-oriented and machine-oriented interpretation tables resides in the label field. A label indicates a position (an address) of a location in a table, so when all the data items are converted into the corresponding numeric values, the address of the branch destination label or the like information is directly stored in each field, thus the label field becomes unnecessary.

Referring to FIG. 5, each field of the human-oriented interpretation table 42 will be described.

The general format of each field (421–426) comprises a name, a displacement, and a flag as follows. A TR register 52 is prepared in the control device 5 corresponding to each field. This TR register 52 has also the same general format.

Name 427: Symbol name (for example, MCDHKN to be described later) assigned to a label, subroutine, or an error number Displacement 428: Value to be added to or subtracted from the content of a value for a position indicated by the symbol name (+99 and −10, for instance. Assuming the value of MOV001 to be five, MOV001+2 results in seven.)

Flag 429:

(1) Indicates an indirect value, or (2) Indicates an error number/

The indirect value is not used as it is (i.e. as a direct value). The content at a location indicated by the indirect value in a table is used for the further processing.

A flag 429 is indicated with an asterisk.

Each field (421–426) of the interpretation table 42 comprises the following items:

Label field 421: Label indicating a position in the table. It is assumed to point to the first position of the attribute field. Assuming MOV001 to be specified as label, MOV001 points the attribute field, MOV001+1 indicates the OK field, and MOV001+2 points the OKIL field.

Attribute field 422:

(1) Attribute for the syntactical check, or (2) Subroutine name (an asterisk is necessary for a flag).

The attribute field 422 corresponds to the attribute field 412 of the name table 41 and is utilized to store therein a value indicating the meaning of a word. Since all data items must be expressed with numeric values in a computer, the meaning of a word is determined by this value. For instance, the symbol attribute MCDPNT assigned to the name of a teaching point (a teaching point is used in a robot system to position a robot to a specific point) is represented with a numeric value "3018". In this case, the same value is also assigned to the attribute MCDPNT in the name table 41.

OK field 423: Processing destination (direct or indirect specification) to which control is to be passed when the attribute matches with the specified item OKIL field 424: Details about the processing when the attributes match with each other (direct or indirect specification)

OKNEXT field 425: Position to which the pointer is to be set for the attribute check of the next word when the attribute match will each other (direct or indirect specification)

NONEXT field 426:

(1) Position in this table at which the compare operation must be carried out if the attributes does not match with each other, or (2) Error number (an asterisk is required for a flag)

As depicted in FIG. 3, the TR register 52 for storing therein data obtained from a field (421–426) of the interpretation table 42 comprises an ATR register 521 for storing the content of the attribute field 422, an OK register 522 for retaining the content of the OK field 423, an OKIL register 523 for keeping the content of storing the content of the OKNEXT field 425, and an NONEXT register 525 for storing the content of the NONEXT field 426. The number of these registers can be changed depending on the construction of fields in the tables. The general format of each register is the same as for each field of the name table described before and comprises three parts, i.e., name displacement, and flag fields. The configuration of each register, however, need not be designed especially for distinguishing between these three parts if each part can be identified when the pertinent info. :ation items are stored in the register, that is, the register area may be used in bit units.

Referring to the flowcharts shown in FIG. 7 to FIG. 10, the processing executed by the table driven translator based on the tables explained above will be described.

Assume that the input statement is represented in the input language as described before:

MOVE A, POO1, S=100

The interpretation processing of the translator will be as follows in this case.

Figure 8:
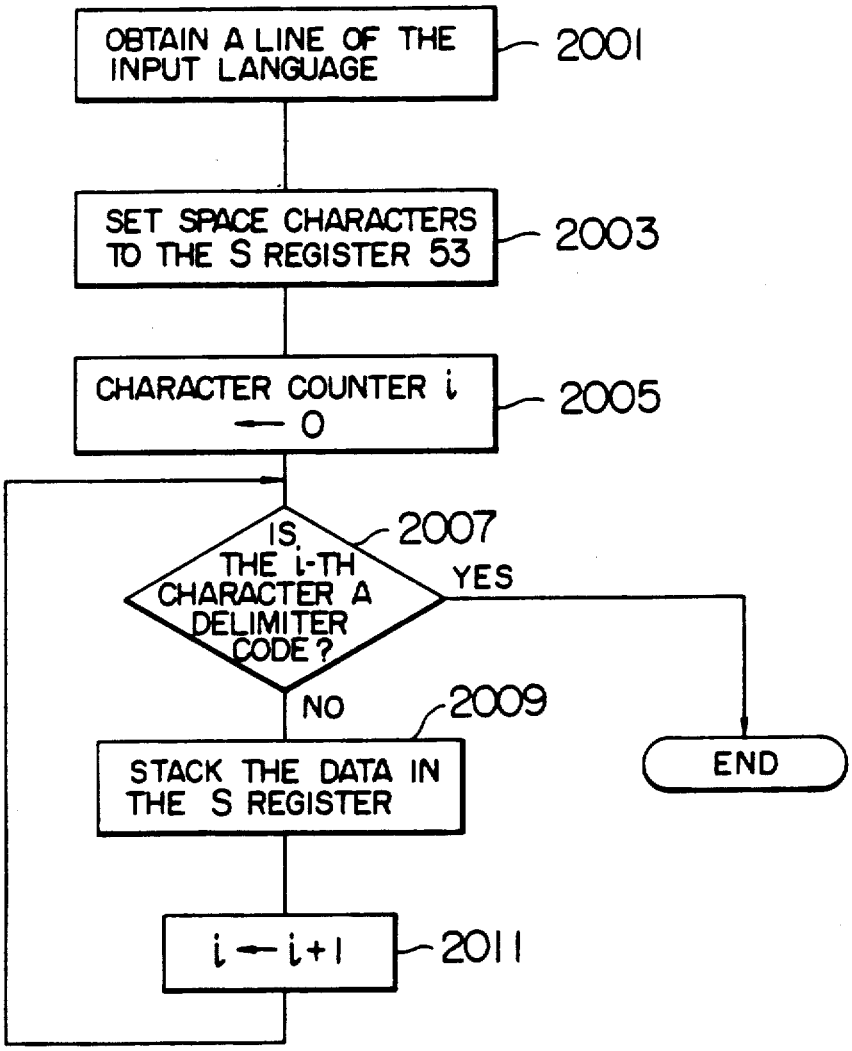
FIGS. 8 to 10 are flowcharts depicting in detail the control procedures shown in FIG. 7.

The input statement contains space characters and special codes such as commas and an equal sign. The translator regards a character string up to such a space character or special code (delimiter code) as a word. The first word (or syllable) of the input statement is thus obtained by detecting a delimiter code and is moved as character string MOVE to the S register 53. (See step 1001 in FIG. 7.)

as illustrated in FIG. 8, after the S register 53 of FIG. 1 is filled with space character (step 2003) when a line of the input language data is obtained, the S register 53 is loaded with the data character by character (2009) while checking for a delimiter code (2007) and counting the number of characters (2011), thereby obtaining the first word.

Figure 9:
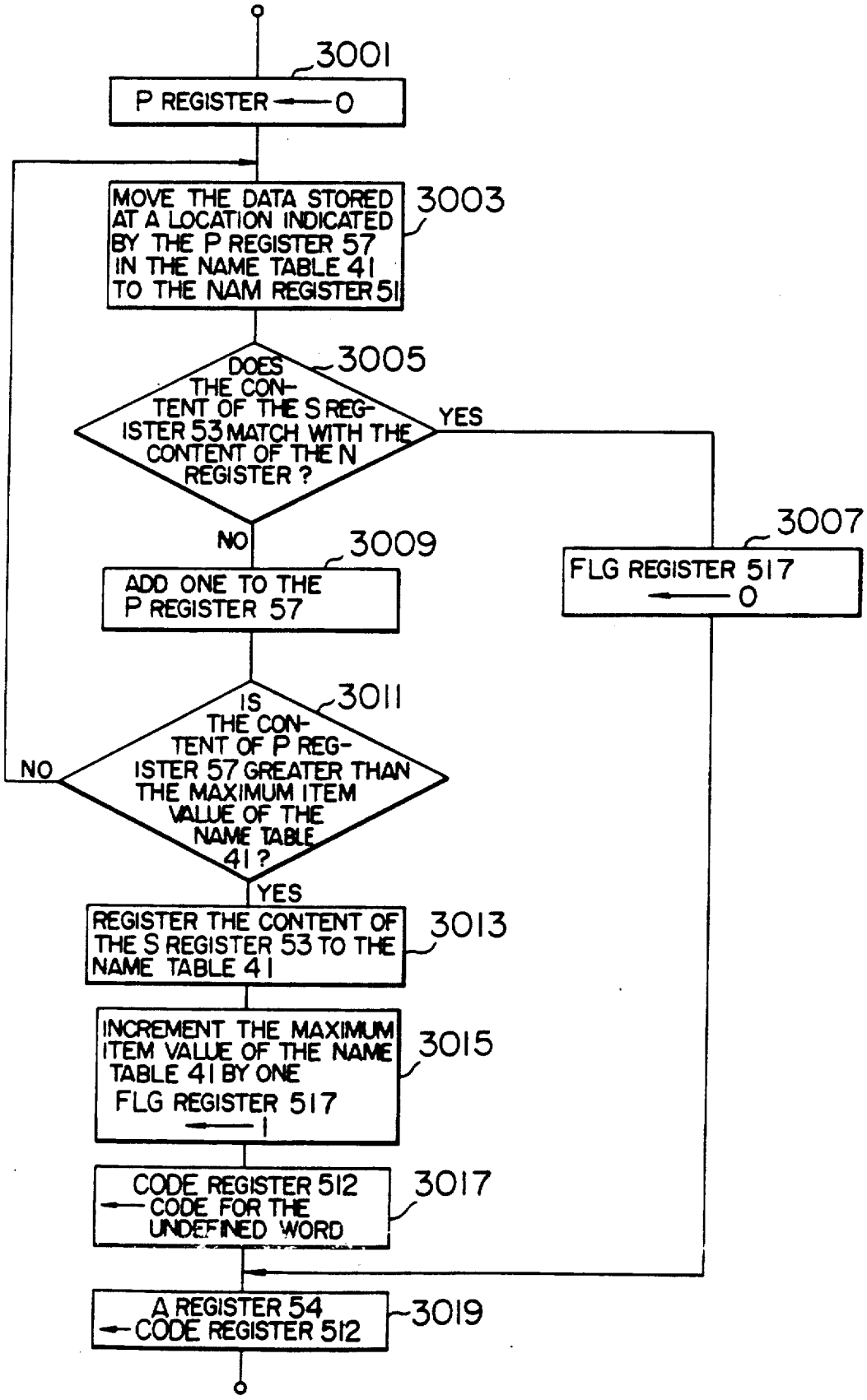

Next, the name table 41 is checked to search for the name field 411 for a name identical to the word MOVE (step 1003). In the processing as depicted in FIG. 9, the control device 5 compares the content (MOVE) of the S register 53 with the content of the name field 411 by the use of the searching device 56 to determine a location in the name table 41 at which the same data (MOVE) is found. In the program, the data stored in the field of the name table 41 indicated by the register 57 used as the index of the name table is moved to the NAM register 51 (step 3003) with the register 57 initially set to zero (step 3001). And thereafter, the content (MOVE) of the S register 53 is compared with that of the N register 511 (a NAM register 51) (step 3005). As a result, if they match with each other, a value "0" indicating that the information has already been registered is stored in the FLG register 517 and the content (MOVE) of the CODE register 512 corresponding to the N register 511 is stored as the attribute of the name in the A register 54 (step 3019). If the contents of the S register 53 and N register 511 do not match, the compare operation is repeated p to the last item stored in the name table 41 (step 3003 to step 3011). As a result, if the word has not been registered to the name table 41 yet the content of the S register 53 is registered to the name table 41 (step 3013) and a value "1" indicating that the relevant word has not been registered is stored in the FLG register 517 and a code indicating that the word has not been defined is set to the CODE register 512 (steps 3015 and 3017).

Then, the start position of the interpretation table 42 for the MOVE statement is moved to the pointer from field 416 of the row containing the matched data in the name table 41. That is, the content (MOV 000) of the PTR register 516 in the NAM register 51 is set to the pointer (step 1005).

Next, the same processing as shown in FIG. 8 is executed to obtain the next word and a word "A" is stored in the S register (step 1007).

The translator checks the word A to determine whether or not it is a delimiter code such as a comma, an equal sign, a plus sign, or a minus sign (step 1009). If this is the case, the attribute specified for the pertinent delimiter code is set. The input character for the delimiter code is utilized as the symbol name of the delimiter code.

If the word is not a delimiter code, the same processing as depicted in FIG. 9 is carried out to search the name table 41 in order to load the A register 54 with the data MCDHKN stored in the attribute field 412 of the name table 41 corresponding to the character "A" stored in the S register 53 (step 1011).

Figure 10:
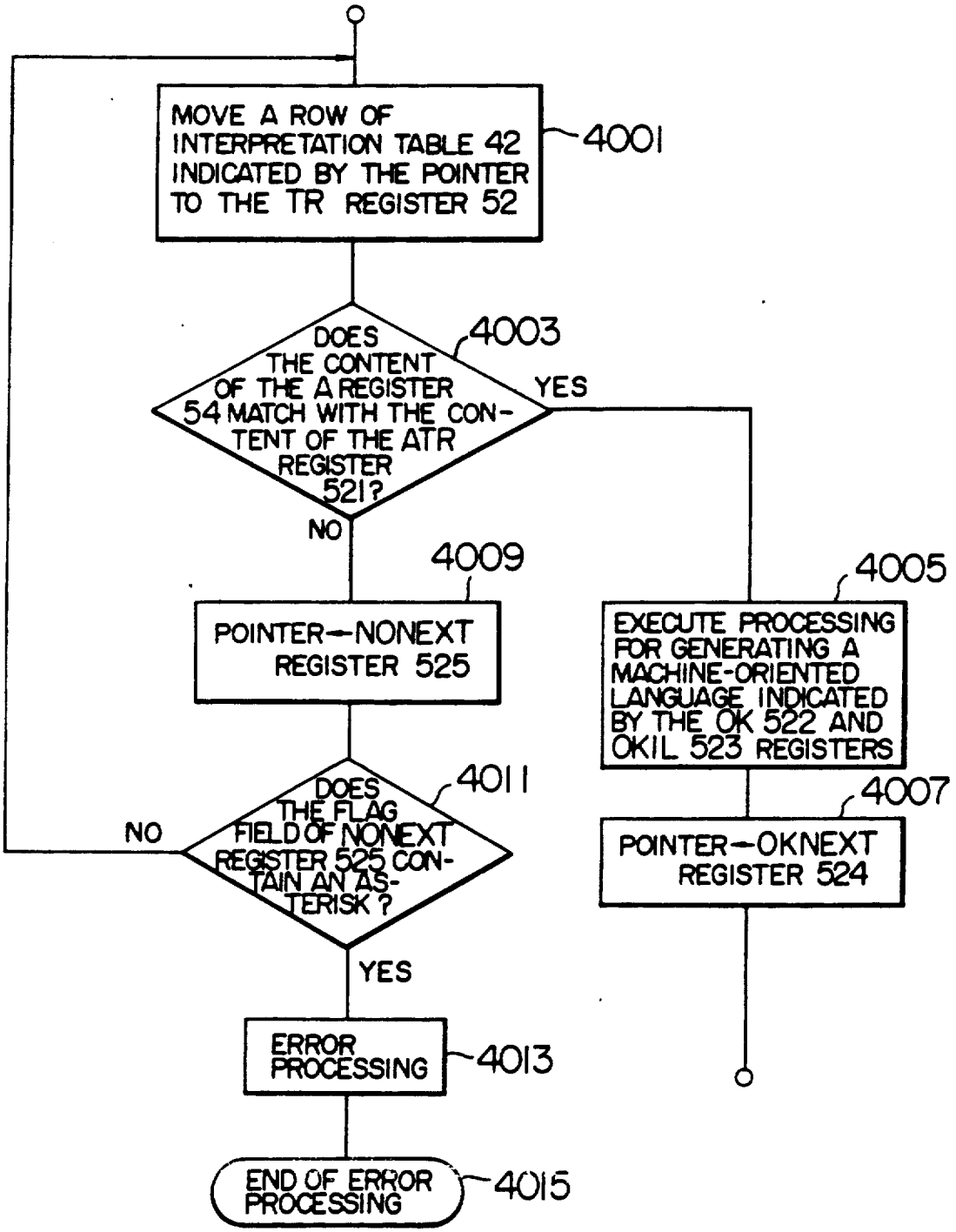

Finally, the processing of FIG. 10 is executed to access the interpretation table 42 to move data stored at a location indicated by the current pointer to the TR register 52, then the translator performs a processing accordingly (step 1013).

Briefly, control is passed from step 1013 to step 1015 and to step 1007, then is returned to step 1009. The content of a field at a location of the interpretation table 42 is stored in the TR register 52 by use of the current pointer indicating the field location (step 4001), and the content of the relevant attribute field (i.e. the content "MCDHKN" of the ATR register 512) is compared with the attribute obtained in the A register is step 1011.

If they are equal to each other, control is passed to the subroutine (SETIL prepared in the translator) indicated by the OK register 522 and the SETIL is executed according to the code indicated by the OKIL register 523 in order to generate the relevant machine-oriented language information (intermediate language (IL)) (step 4005), then the pointer is set to the position MOV001 indicated by the OKNEXT register 524 (step 4007). In this case, the OK register 522 indicates a processing destination address, while the OKIL register 523 indicates a processing procedure.

The machine-oriented language information (IL information) 43 comprises internal codes configured in such a predetermined format as depicted in FIG. 11a.

For the input statement "MOVE A, POO1, S=100", consequently, if it is assumed that a code "100" is used for the word MOVE indicating the type of input language, a code "1" for A, "400" for the address of POO1, a code "1" for S, and "10" for the address on the table at which a value 100 is stored, then as illustrated in FIG. 11b, the instruction code field 431 is loaded with "100", the operand count field 432 with the number "4" of the operands (A, POO1, etc.), and the fields 433–436 of the operands #1 to #4 with values for operand addresses or codes "1", "400", "1", and "10", respectively.

If the compared data items do not match with each other, the pointer should be set to the location indicated by the NONEXT register 525 (step 4009); however, since the pertinent location contained in the MOVE statement cannot be used for other than the interpolating methods A, I, and C, the ERRHKN code indicating an error of the interpolating method specification is stored in the NONEXT register 525, and the processing for the input statement is finished (steps 4011–4015).

Although the translator is similarly controlled in the subsequent operation in accordance with the interpretation table 42, if a plurality of types are allowed for an input item to be specified at a position in an input statement, for example, for {A, I, C} and {S, H} in the input statement described above, the translator allows to specify one of the parameters at the respective location. As illustrated in the name table 41 of FIG. 4, the same attribute (MCDHKN) is assigned to all of A, I, and C, while S and H have the different attributes MCDS and MCDH, respectively. In such a case, a processing must be specified for each of S and H in the interpretation table 42. Referring to FIG. 5, the content of the A register 54 is first compared with that (MCDS) of the attribute field 422 for the MDV004 (step 4003). If they are not equal to each other, the pointer is set to the MOV005 in the NONEXT field 426 to check whether or not the data is "MCDH" (step 4009). And thereafter, the content of a field indicated by the pointer (MDV005) is moved from the interpretation table 42 to the TR register (step 4001), and the content of the A register is compared with that of the ATR register 521 which stores the content "MCDH" of the attribute field 422 (step 4003). If these data items do not match with each other also in this compare operation, it is indicated that a character or character string other than S and H is specified in the input statement, hence an error is assumed for ERROPT* and the error processing is executed, then the translation processing is terminated (steps 4009–4015).

Figure 7:
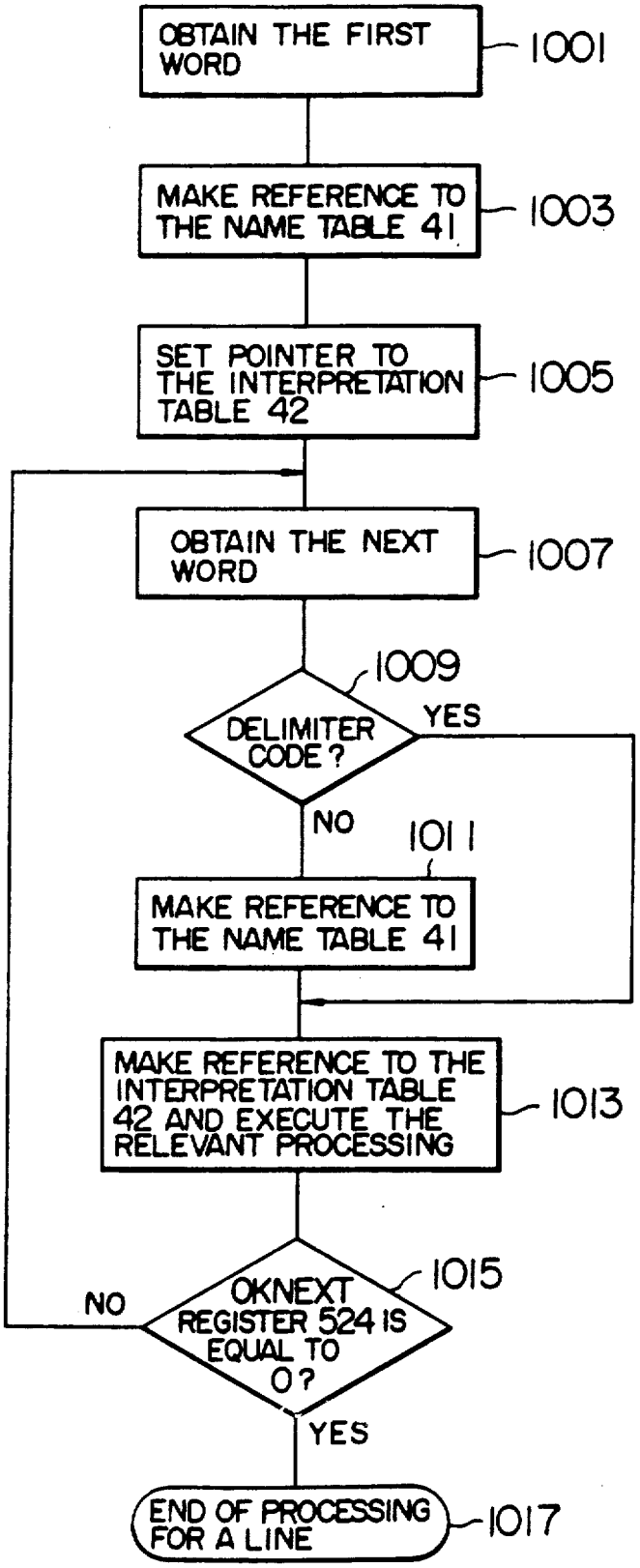
FIG. 7 is a general flowchart of an example of control procedures in a translator in accordance with the present invention.

That is, the processing of step 1013 shown in FIG. 7 is repeated until the attributes match with each other or the NONEXT register 525 indicates an error.

The translation processing is terminated by identifying the end of input statement. If the end of statement is detected in step 1007 for obtaining the next word (for example, if space characters continue up to column 80 assuming that a line comprises 80 columns), the attribute MCDEND indicating the end of input statement is outputted. This attribute is then compared with the pertinent information of the interpretation table 42. If they match with each other, the pointer is set to the value of the OKNEXT register 524. In this case, the relevant positions of the OKNEXT field 425 in the interpretation table 42 are filled with space characters indicating a value "0". Therefore, the value of the OKNEXT register 524 is other than zero in step 1015 depicted in FIG. 7, and this stage is regarded as the normal termination of the translation processing for a line.

As described hereabove, since the translation processing is represented by the processing of FIG. 7 applicable to general purposes and the control procedures to be used by the control device 5 for the syntax interpretation of the input statement are summarized as the interpretation table 42, a translator which is applicable to general purposes and which can translate input language having various syntax systems can be made.

Figure 13:
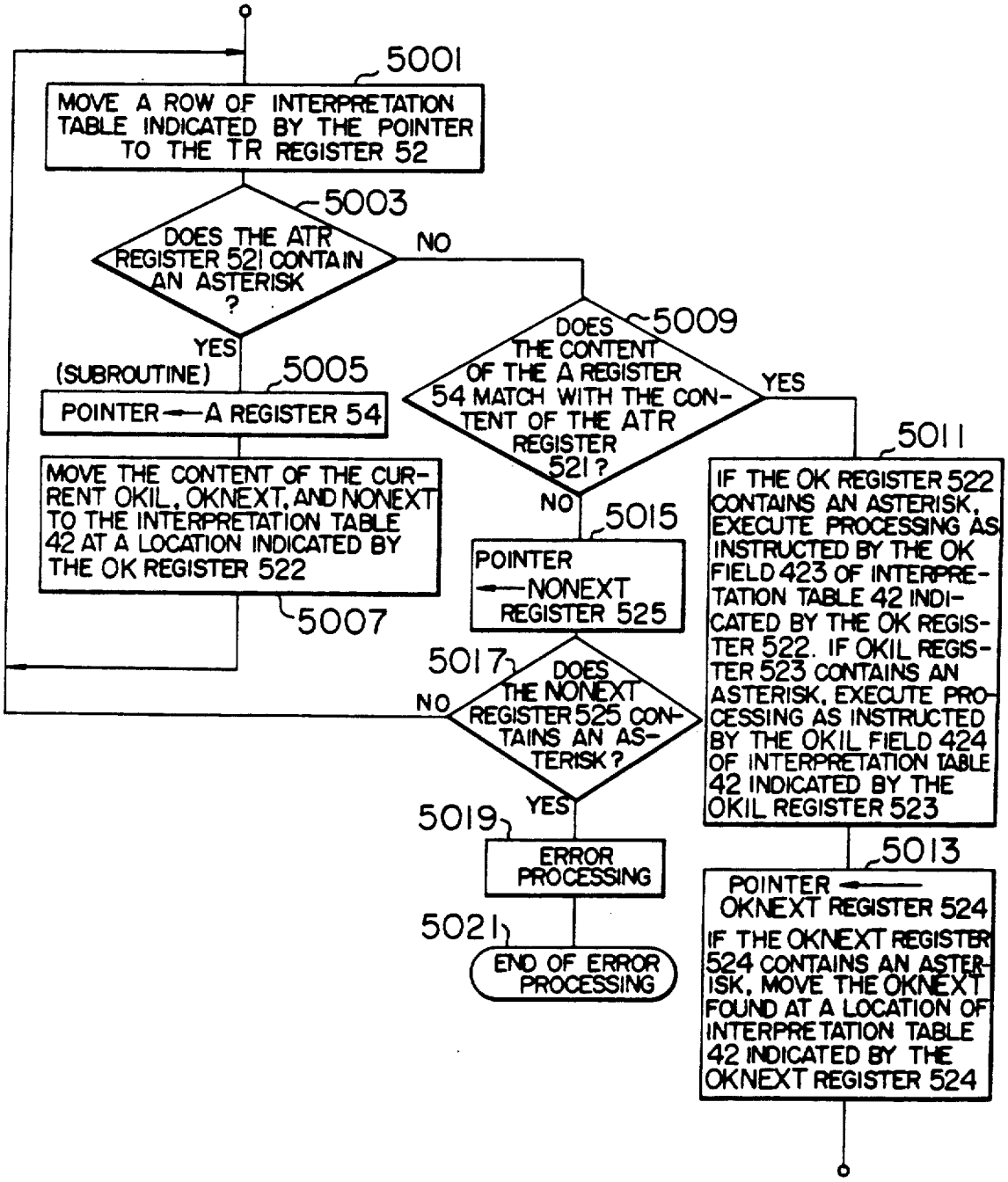
FIG. 13 is a flowchart of the main routine of the control procedures shown in FIG. 12.

The interpretation table 42 contains the control procedure of the control device 5, thus the language processor can be controlled with programs by changing the control procedure. In FIG. 5, for example, a pair of an integer constant and variable are specified for checking the integer attribute (labels MOV007 and MOV008), thus the interpretation table must contain a pair of processings for MCDINO and MCDIVR in any case. An effective processing performance cannot be obtained if the translation procedure for such a pair of attributes is indicated by use of the method as depicted in FIG. 5 in which the separate information items are listed for each attribute. To improve the performance, the relevant information items are gathered and stored, that is, the control procedures utilized as subroutines are stored in the interpretation table 42 illustrated in FIG. 12. FIG. 13 depicts a flowchart for processing the interpretation table 42 of FIG. 12. A sequence of programming descriptions are specified beginning from a label INT000, which will be regarded as a subroutine by specifying INT000*. The return address and other associated information can be controlled with the translator by moving the values stored in the fields OKIL to NONEXT for MOV007 to the locations as indicated INTFN+2 to INTFN+4, respectively (steps 5003, 5005, and 5007). Since the locations for storing the return addresses are uniquely determined as INTFN+2 to INTFN+4 for INT000, so-called recursive call is not allowed. The rest of the processing is the same as illustrated in FIG. 10. Steps 5011 and 5013 are intermediate processing.

When the pointer is set to the position indicated by MOV007 and the content of the relevant field in the table is stored in the TR register 52 (step 5001), the flag section of the ATR register 521 which stores the content of the attribute field 422 is checked whether or not there exists an asterisk for a subroutine call (step 5003).

If the content of the attribute field is "INT000*" containing an asterisk as depicted in FIG. 12, the "INT000" is set to the pointer (step 5005) and the contents ADR, MOV009, and ERRITM* of the current OKIL, OKNEXT, and NONEXT fields are moved to the interpretation table 42 beginning from a location INTFN+2.

Afterwards, the content of the table 42 is moved to the TR register 52 beginning from the table location indicated by INT000 (step 5001). Since the ATR register does not contain the flag (i.e. asterisk) in this case, the content of the A register 54 is compared with that of the ATR register 521 (step 5009). If they match with each other, the processing of step 5011 is started. Referring to FIG. 12, the OKIL field 425 contains the flag (asterisk), hence the translator conducts a processing in accordance with the content "ADR" of the OKIL field 424 at a location indicated by INTFN+2. Furthermore, the content "MOV009" of the OKNEXT field at a table location INTFN+3 indicated by the OKNEXT register 524 is moved.

On the other hand, if the contents of A register 54 and ATR register 521 do not match with each other, the content "INTFN" of the NONEXT register 525 is set to the pointer (step 5015) and a table field indicated by the pointer is moved from the interpretation table 42 to the TR register 52 (step 5001), then the same processing is performed.

If the value of OK register 522 is specified in the indirect mode for an indirect jump, the detailed processing of the interpretation can be executed on the interpretation table 42 in the translator. For instance, assume an example in which P1, P2, and P3 are executed when an attribute matches with the item to be compared and the machine oriented language information 43 is generated when P2 is carried out by executing P21 and P22. Then, the translator can automatically perform the processing if the information items listed in FIG. 14 are prepared as the information to be set to the TR register 52. That is, if the attribute matches for S001* stored in the OK field 423 in the line indicated by L0001, the translator executed P1 specified in the line indicated by S001. This means that S001 is not directly carried out. In this case, furthermore, if the return address to which the pointer is set after the processing; i.e., if L0002 in this table 42 is set to the OKNEXT field in the line indicated by S003 stored in the OKIL field 424, control can be returned to L0001 after the processing of S001 is finished.

Figure 15:
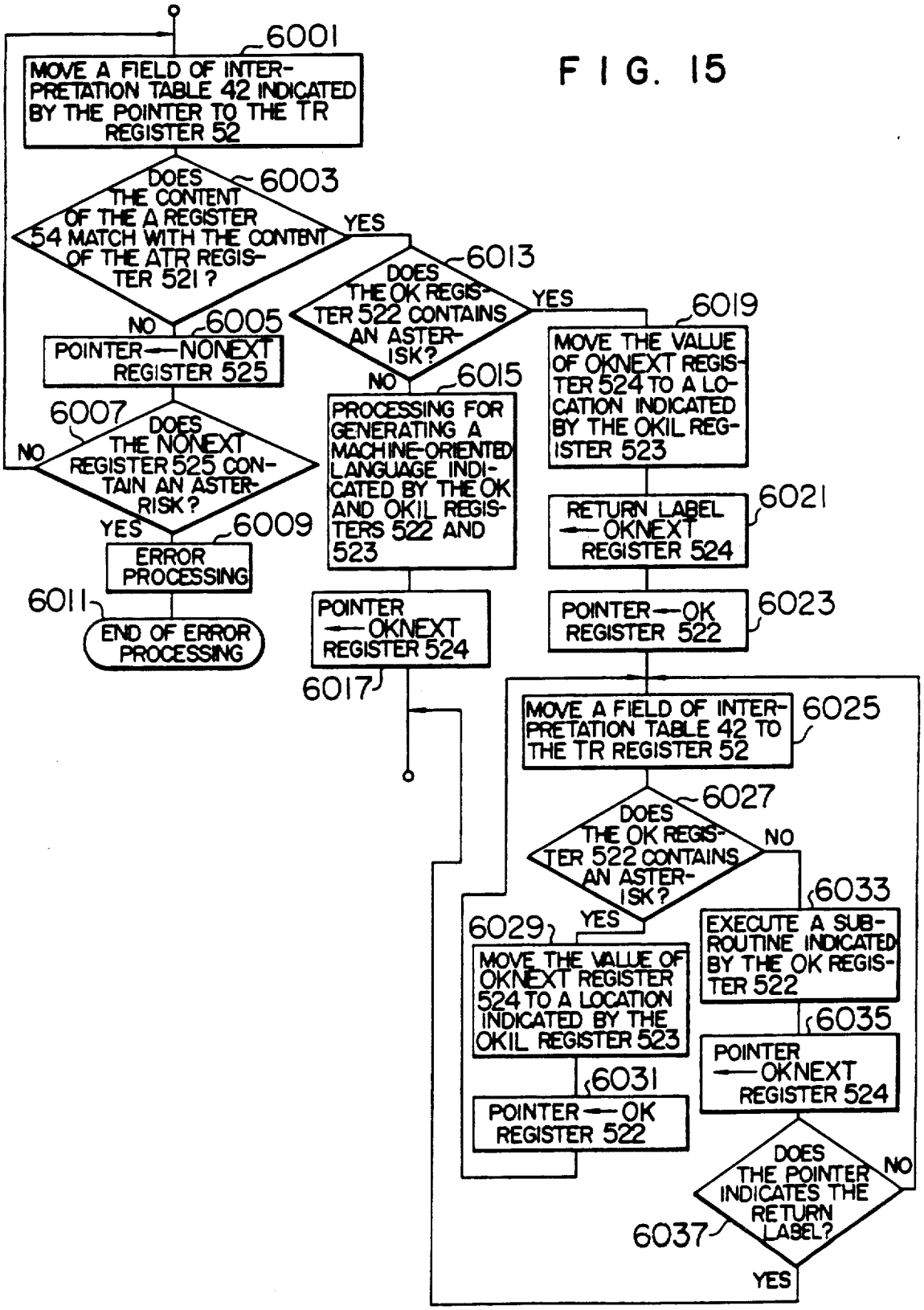
FIG. 15 is a flowchart of the main routine of the processing procedures depicted in FIG. 14.

Since P1 is specified in the direct mode for S001, the translation processing indicated by P1 is executed. In an ordinary case, a subroutine having the same name (P1) is incorporated into the translator in advance and the execution address for performing the subroutine is set to the OK register 522, thus the subroutine will be executed. Next, the value of S002 indicated by the content of the OKNEXT field 425 is set to the pointer and control is passed to the pointer location. Since P2 is specified in the indirect mode for S002, the same processing as for L0001 is carried out, that is, P21 specified in the line indicated by P2 is executed, and the pointer is finally set to S003. The translator is controlled in the similar manner in the subsequent processing. FIG. 15 depicts the processing of the interpretation table 42 in this case. As the processing for the OK field 423, an operation may be specified, that is, a detailed control procedure may be stored in the OK field 423. As the processing name which is the minimum unit of processing to be stored in the OK field 423, the value corresponding to the address of the relevant processing section in the translator can be specified.

As described above, a translator system applicable to general purposes can be implemented and the maintainability and expandability of the translator is improved by retaining the translation control procedures including some processings stored in the translator in the interpretation table 42.

Next, the processing of FIG. 15 to be executed in accordance with the interpretation table 42 of FIG. 14 will be described.

If L0001 is set to the pointer, the content of a field at a location indicated by the pointer is moved from the interpretation table 42 to the TR register 52 (step 6001). If the content of the A register 54 matches with that of the ATR register 521 (step 6003), the translator checks whether or not the flag (asterisk) exists in the OK register 522 (step 6013). As depicted in FIG. 14, if the OK field 423 contains "S001*", the value (L0002) of the OKNEXT register 524 is moved to the location (S003+4) indicated by the OKIL register 523 (step 6019). The L0002 is assigned as the return label (step 6021) and the content "S001" of the OK register 522 is set to the pointer (step 6023).

Next, the content of a field indicated by S001 is moved to the TR register 52 (step 6025) and the subroutine 37 P1" indicated by the OK register 522 is executed (step 6033). The content "S002" of the OKNEXT register 524 is set to the pointer (step 6035) and control is passed to the processing specified in the row represented by S002. Since the OK register 522 contains 37 P2*", control is passed from step 6027 to step 6029, and the value "S003" of the OKNEXT register 524 is moved to a location (the OKNEXT field 425 for the PE2) indicated by P2E+4. The similar processing is executed with the pointer set to the content (P2*) of the OK register and is repeated until the pointer returns to the return label "L0002" (step 6037). The rest of the processing is the same as that depicted in FIG. 10.

For a language system not provided with reserved words, the processing is not always executed in the forward direction on the interpretation table 42, that is, control may be passed backward in some cases. The processing, however, can be accomplished by specifying the necessary parameters as illustrated in FIG. 16. Let us consider a "DO" statement of the FORTRAN language. In this language system, "DO 10 I=1,2" is a DO statement, while "DO 10 I=1" is an assignment statement. The difference between these statements cannot be clarified until a comma is found. Consequently, it is only required to construct a control procedure in which an assignment statement processing is assumed if the comma is missing.

Robot applications of the present invention are described in the article "Assembly Robot Language and Control Software" presented at AUTOFACT 5 of SME, Nov. 17, 1983 Detroit, U.S.A., of which the disclosure is incorporated in this application by reference.

In accordance with the present invention as described in detail hereabove, the syntax processing conventionally executed in a translator and a part of processing description can be stored in the interpretation table, hence the translation processing becomes quite flexible with respect to changes in the language syntax; a translator which is applicable to general purposes for processing other language systems can be made, thereby realizing a remarkable effect for improving the maintainability and expandability of the language processing in a computer.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

I claim:

1. A language processing system for translating an input statement of a selected source language into a lower-level machine-oriented language comprising:

(a) input means for inputting an input statement written in the selected source language of a computer;

(b) storage means for storing a first table for storing keywords of grammer of said selected source language and characteristics of the keywords and for storing characteristics of variables used in a program coded by said selected source language;

a second table for storing information of control procedures for interpreting the input statement to translate the input statement into a lower-level machine-oriented language, said information being [predetermined and] based on syntax-/grammer of the selected source language;

(c) control means, *coupled to said input means, and said storage means*, for controlling translation processing of an input statement written in the selected source language from said input means, said control means including searching means *comparing means, and converting means, said searching means* responsive to said input statement for searching said first table to obtain a location therein at which a desired keyword variable is stored and to obtain an attribute associated with said keyword *and* variable;

*said* comparing means for comparing said attribute from said searching means with a corresponding attribute stored in said second table to check whether the syntax of the input statement [meets] *matches* the grammer of said selected source language; and

*said* converting means responsive to a determination of a match between said attribute as a result of the comparison by said comparing means, for converting said input statement into a lower-level machine-oriented langu ge based on a [predetermined] conversion ' .

2. The system according to claim 1, wherein said first table comprises:

a name area for storing the name of reserved words as said keywords and the name of variables;

an attribute area for storing codes indicating attributes defined for each meaning of the names stored in said name area;

an address area for storing addresses within the store means of the variables stored in said name area;

a code area for storing codes indicating types of said reserved words;

a value area for storing values identifying reserved words having the same attribute; and a pointer area for storing a pointer indicating where an interpretation control procedure for an instruction indicating by said reserved word starts in said second table.

[3. The system according to claim 1 wherein said second table stores information of a precessing procedure for checking whether or not the attribute of an input statement word including one of a keyword, variable numerical value and delimiter matches with the selected source language syntax and information of a processing procedure to be executed with the attribute of the word matches with the selected source language syntax and a processing procedure to be executed when the attribute of the word does not match with the selected source language syntax, following the result of said matching check.]

[4. The system according to claim 1, wherein said second table comprises:

a first area for storing attributes for input statement words to be checked for the selected source language syntax;

a second area for storing the destination of a processing to be executed when an input statement word matches with said attribute in said first area;

a third area for storing details of a processing to generate said lower-level machine-oriented language, corresponding to the processing destination indicated in the said second area when the input word matches with said attribute in said first area;

a fourth area for storing a pointer indicating the destination of a reference on the second table for checking the attribute of the next statement word when the input statement word matches with said attributes, and a fifth area for storing a location in the second table to be referred to in the first area to further compare the input statement word with another attribute in said location in the second table or the content of an error processing when the input statement word does not match with said attribute in said location in the second table.]

[5. The system according to claim 4 wherein said first area in said second table includes codes for accessing subroutines and information concerning translation control procedures for said subroutines as described in a specified location of said second table.]

[6. The system according to claim 4 wherein said second area of the second table has a flag indicating whether the name of each of the symbols stored in the second area is a direct value or an indirect value.]

[7. The system according to claim 4 wherein each of said first to fifth areas of said second table stores the name of symbols, displacement values of the contents and locations indicated by the symbol names and a flag indicating whether a name of a symbol is an indirect value or an error number.]

8. The system according to claim 1 wherein said second table includes a processing program representing said predetermined conversion rule.

9. The system according to claim 1 wherein said storage means includes a random access memory for selectively loading the contents of said first and second tables for each selected source language.

*10. The system according to claim 1, wherein said second table comprises:*

*a first area for storing attributes for input statement words to be checked for the selected source language syntax;*

*a second area for storing the destination of a processing to be executed when an input statement word matches with said attributes in said first area;*

*a third area for storing details of a processing to generate said lower-level machine-oriented language, corresponding to the processing destination indicated in the said second area when the input word matches with said attribute in said first area;*

*a fourth area for storing a pointer indicating the destination of a reference on the second table for checking the attribute of the next statement word when the input statement word matches with said attributes, and*

*a fifth area for storing a location in the second table to be referred to in the first area to further compare the input statement word with another attribute in said location in the second table or the content of an error processing when the input statement word does not match with said attribute in said location in the second table.*

*11. The system according to claim 10, wherein said second table stores information of a processing procedure including a sequence of attributes which reflects grammatically correct sequence parameters for every type of permissible statement of said selected language, said information being used to check, by comparing said attribute stored in a location of said second table with an attribute of an input statement fetched from said first table or determined through syntaxical analysis whether or not the attribute of an input statement word including one of a keyword, variable numerical value and delimiter matches with the selected source language syntax and information of a processing procedure to be executed when the attribute of the word matches with the selected source language syntax and a processing procedure to be executed when the attribute of the word does not match with the selected source language syntax, following a result of said matching check to check whether alternative words are possible or not at the location of an input statement by changing a parameter to a value in said fifth area.*

*12. A language processing system for translating an input statement of a selected source language into a lower-level machine-oriented language comprising:*

*(a) input means for inputting an input statement written in the selected source language of a computer;*

*(b) storage means for storing*

*a first table for storing keywords of grammar of said selected source language and characteristics of the keywords and for storing characteristics of variables used in a program coded by said selected source language;*

*a second table for storing information of control procedures for interpreting the input statement to translate the input statement into a lower-level machine-oriented language, said information being based on syntax/grammar of the selected source language;*

*(c) control means, coupled to said input means, and said storage means, for controlling translation processing of an input statement written in the selected source language from said input means, said control means*

*including searching means, comparing means, and converting means, said searching means responsive to said input statement for searching said first table to obtain a location therein at which a desired keyword variable is stored and to obtain an attribute associated with said keyword and variable;*

*comparing means for comparing said attribute from said searching means with a corresponding attribute stored in said second table to check whether the syntax of the input statement matches the grammar of said selected source language;*

*converting means, responsive to a determination of a match between said attributes as a result of the comparison by said comparing means, for converting said input statement into a lower-level machine-oriented language based on a conversion rule; and wherein said second table comprises*

*a first area for storing attributes for input statement words to be checked for the selected source language syntax;*

*a second area for storing the destination of a processing to be executed when an input statement word matches with said attribute in said first area;*

*a third area for storing details of a processing to generate said lower-level machine-oriented language corresponding to the processing destination indicated in the said second area when the input word matches with said attribute in said first area;*

*a fourth area for storing a pointer indicating the destination of a reference on the second table for checking the attribute of the next statement word when the input statement word matches with said attributes;*

*a fifth area for storing a location in the second table to be referred to in the first area to further compare the input statement word with another attribute in said location in the second table or the content of an error processing when the input statement word does not match with said attribute in said location in the second table; and wherein*

*said first area in said second table includes codes for accessing subroutines and information concerning translation control procedures for said subroutines as described in a specified location of said second table.*

*13. A language processing system for translating an input statement of a selected source language into a lower-level machine-oriented language comprising:*

*(a) input means for inputting an input statement written in the selected source language of a computer;*

*(b) storage means for storing*

*a first table for storing keywords of grammar of said selected source language and characteristics of the keywords and for storing characteristics of variables used in a program coded by said selected source language;*

*a second table for storing information of control procedures for interpreting the input statement to translate the input statement into a lower-level machine-oriented language, said information being based on syntax/grammar of the selected source language;*

*(c) control means, coupled to said input means, and said storage means, for controlling translation processing of an input statement written in the selected source language from said input means, said control means including searching means, comparing means, and converting means, said searching means responsive to said input statement for searching said first table to obtain a location therein at which a desired keyword variable is stored and to obtain an attribute associated with said keyword and variable;*

*comparing means for comparing said attribute from said searching means with a corresponding attribute stored in said second table to check whether the syntax of the input statement matches the grammar of said selected source language;*

*converting means responsive to a determination of a match between said attributes as a result of the comparison by said comparing means, for converting said input statement into a lower-level machine-oriented language based on a conversion rule; and wherein said second table comprises*

*a first area for storing attributes for input statement words to be checked for the selected source language syntax;*

*a second area for storing the destination of a processing to be executed when an input statement word matches with said attribute in said first area;*

*a third area for storing details of a processing to generate said lower-level machine-oriented language corresponding to the processing destination indicated in the said second area when the input word matches with said attribute in said first area;*

*a fourth area for storing a pointer indicating the destination of a reference on the second table for checking the attribute of the next statement word when the input statement word matches with said attributes;*

*a fifth area for storing a location in the second table to be referred to in the first area to further compare the input statement word with another attribute in said location in the second table or the content of an error processing when the input statement word does not match with said attribute in said location in the second table; and wherein*

*said second area of the second table has a flag indicating whether the name of each of the symbols stored in the second area is a direct value or an indirect value.*

*14. A language processing system for translating an input statement of a selected source language into a lower-level machine-oriented language comprising:*

*(a) input means for inputting an input statement written in the selected source language of a computer;*

*(b) storage means for storing*

*a first table for storing keywords of grammar of said selected source language and characteristics of the keywords and for storing characteristics of variables used in a program coded by said selected source language;*

*a second table for storing information of control procedures for interpreting the input statement to translate the input statement into a lower-level machine-oriented language, said information being based on syntax/grammar of the selected source language;*

*(c) control means, coupled to said input means, and said storage means, for controlling translation processing of an input statement written in the selected source language from said input means, said control means including searching means, comparing means, and converting means, said searching means responsive to said input statement for searching said first table to obtain a location therein at which a desired keyword variable is stored and to obtain an attribute associated with said keyword and variable;*

*comparing means for comparing said attribute from said searching means with a corresponding attribute stored in said second table to check whether the syntax of the input statement matches the grammar of said selected source language;*

*converting means responsive to a determination of a match between said attributes as a result of the comparison by said comparing means, for converting said input statement into a lower-level machine-oriented language based on a conversion rule; and wherein said second table comprises*

*a first area for storing attributes for input statement words to be checked for the selected source language syntax;*

*a second area for storing the destination of a processing to be executed when an input statement word matches with said attribute in said first area;*

*a third area for storing details of a processing to generate said lower-level machine-oriented language corresponding to the processing destination indicated in the said second area when the input word matches with said attribute in said first area;*

*a fourth area for storing a pointer indicating the destination of a reference on the second table for checking the attribute of the next statement word when the input statement word matches with said attributes;*

*a fifth area for storing a location in the second table to be referred to in the first area to further compare the input statement word with another attribute in said location in the second table or the content of an error processing when the input statement word does not match with said attribute in said location in the second table; and wherein*

*each of said first to fifth areas of said second table stores the name of symbols, displacement values of the contents and locations indicated by the symbol names and a flag indicating whether a name of a symbol is an indirect value or an error number.*

* * * * *